United States Patent
Langrock et al.

(12)

(10) Patent No.: US 8,719,081 B1
(45) Date of Patent: May 6, 2014

(54) BID ADJUSTMENT SCHEDULING FOR ELECTRONIC ADVERTISING

(75) Inventors: David J. Langrock, Sammamish, WA (US); Luke A. Snyder, Seattle, WA (US); Robert Lockhart Reid, Seattle, WA (US); Eric Alfred Herrmann, Snohomish, WA (US)

(73) Assignee: Amazon Technologies, Inc., Reno, NV (US)

( * ) Notice: Subject to any disclaimer, the term of this patent is extended or adjusted under 35 U.S.C. 154(b) by 1081 days.

(21) Appl. No.: 12/267,833

(22) Filed: Nov. 10, 2008

(51) Int. Cl.
*G06Q 30/00* (2012.01)
*G06Q 90/00* (2006.01)

(52) U.S. Cl.
CPC ................................. *G06Q 90/00* (2013.01)
USPC ............................................................. 705/14.1

(58) Field of Classification Search
CPC ............................................................ G06Q 90/00
USPC ............................................................ 705/14.1
See application file for complete search history.

(56) References Cited

U.S. PATENT DOCUMENTS

2008/0255921 A1 * 10/2008 Flake et al. .................. 705/10

OTHER PUBLICATIONS

U.S. Appl. No. 12/204,636, filed Sep. 4, 2008, for Luke A. Snyder et al.
U.S. Appl. No. 12/204,650, filed Sep. 4, 2008, for Luke A. Snyder et al.
U.S. Appl. No. 12/204,663, filed Sep. 4, 2008, for Lucas P. Hansen et al.

* cited by examiner

*Primary Examiner* — Daniel Lastra
(74) *Attorney, Agent, or Firm* — Novak Druce Connolly Bove + Quigg LLP

(57) ABSTRACT

Bid amounts for electronic advertising can be adjusted throughout the day, or for different days, according to a day parting schedule based on factors such as variations in efficiency. For any set of advertisements grouped based on factors such as keyword, landing page, geographic location, user demographic, etc., values can be forecast for each time period throughout the day. A variation threshold is used to group adjacent periods of time into partitions, and the threshold can be varied until the number of partitions meets the requirements of the provider with whom the advertisement is to be placed. An adjustment factor can be determined for each partition using the forecast information, and these factors can be uploaded to the provider to adjust the base bid price for any advertisement in that group at the appropriate times throughout the day.

25 Claims, 4 Drawing Sheets

BID ADJUSTMENT SCHEDULING FOR ELECTRONIC ADVERTISING

BACKGROUND

As the number of users viewing information and purchasing items electronically increases, there is a corresponding increase in the amount of advertising revenue spent in electronic environments. In some cases, advertisements are specifically selected for certain pages or other interfaces displayed to a user. In other cases, these advertisements are selected based on content that can be displayed in any of a number of different pages. For example, a user might search for information about a keyword through a search engine. When a results page is returned to the user that includes search results relating to that keyword, at least one advertisement can be included with the results page that relates to the keyword and/or search results. Often, the advertisement includes a hypertext link or other user-selectable element that enables the user to navigate to another page or display relating to the advertisement.

The selection of the content to include with the advertisement, such as text, graphics, audio, and/or video for the advertisement, as well as the page to which the user may navigate (hereinafter referred to as the "landing page"), is determined such that the user viewing the advertisement on the search results page not only will be interested in following the link, but in the case of advertising an item, also will be likely to buy or otherwise consume the advertised item. An advertiser also must consider other factors, such as how much to spend for each advertisement. Conventional systems for determining bid amounts are relatively static, and suggest default bid prices based on factors such as category or item type. These bid prices are typically used for extended periods of time, and are only occasionally updated as a result of business campaigns, category performance, or other such reasons.

Certain advertisements, however, perform differently at certain times, in certain areas, etc. For example, children's toys might sell well in the morning hours or mid-day, but may not sell very well at night, such that the conversion rate or revenue for toy ads varies drastically by time of day. As another example, snow shoes might generate a significantly larger amount of revenue in Canada as compared to Mexico, although the actual conversion rate per ad displayed might actually be higher in Mexico. Grill-related items might sell better on the weekends in all areas, etc. Accordingly, it can be desirable to spend more advertising budget at those times and places where the ad is performing well, and less at other times. While some providers allow for the opportunity to adjust bids at certain points in the day, the determination of which bids to adjust and the amount to adjust at various times for large numbers of ads can be impractical using existing systems, which often require manual intervention or rely on averages or other imprecise data to attempt to adjust bid pricing.

BRIEF DESCRIPTION OF THE DRAWINGS

Various embodiments in accordance with the present disclosure will be described with reference to the drawings, in which.

DETAILED DESCRIPTION

Figure 1:
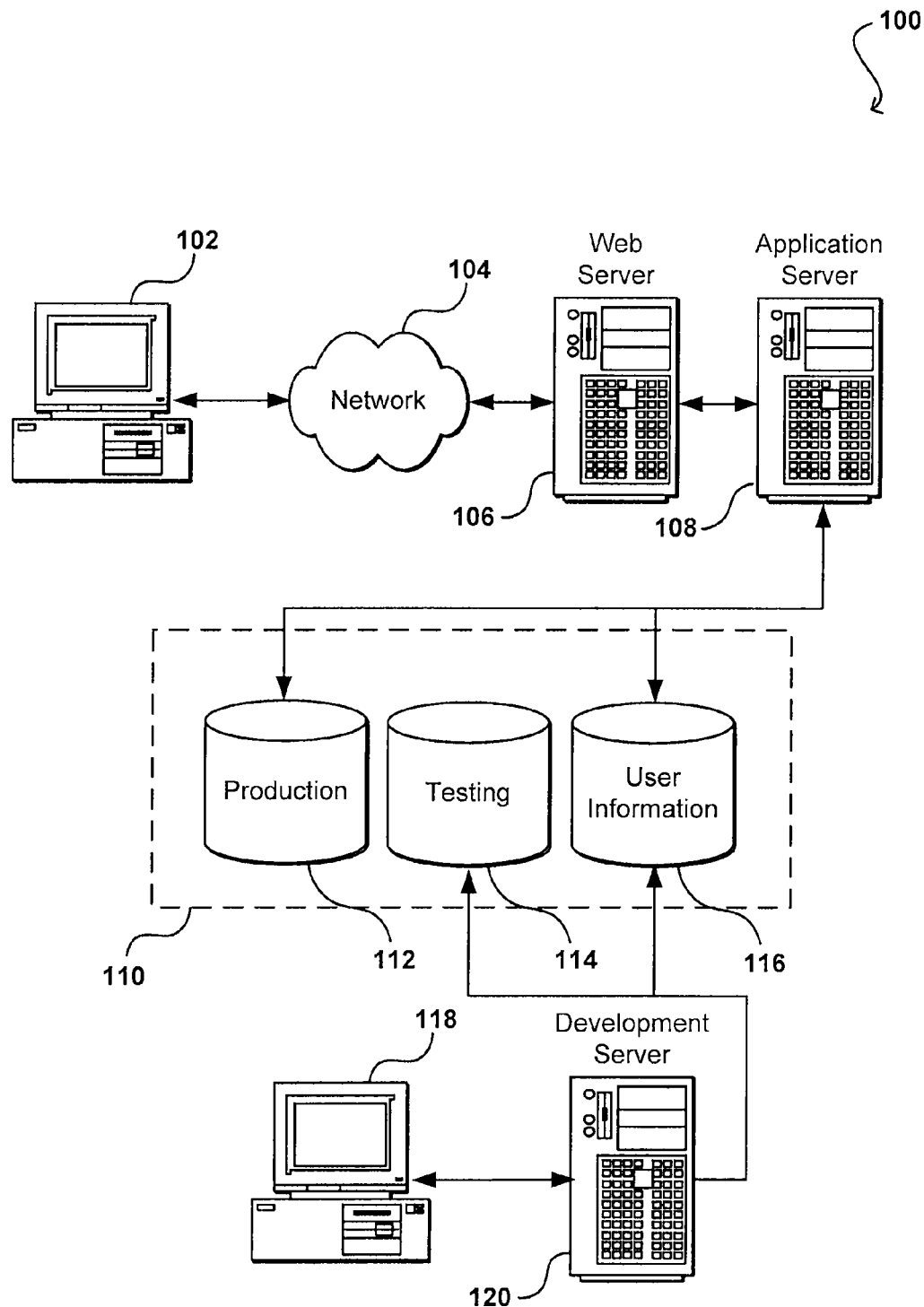
FIG. 1 illustrates an environment in which various embodiments can be implemented.

Systems and methods in accordance with various embodiments of the present disclosure may overcome one or more the aforementioned and other deficiencies experienced in conventional approaches to determining bid prices for advertisements such as sponsored links in an electronic environment. Systems and methods in accordance with various embodiments provide approaches for dynamically determining bid adjustments for different times of the day, days of the week, geographical locations, and/or other such aspects. The variation in bid pricing according to a determined schedule is referred to herein as "day parting". As known in the art, "sponsored links" or "sponsored ads" are typically used with electronic interfaces such as Web sites, search engines, applications, etc., wherein an advertiser provides a navigational element such as a hypertext link and associated text and/or graphics to be displayed in the electronic interface, that enable a user to select or otherwise access the navigational element to be directed to a page or other location provided by the advertiser. In some situations, the advertiser will pay a provider of the electronic interface based upon an aspect of each sponsored ad, such as the number of times users select the navigational element included therein. As known in the art, many providers select advertisements to be displayed with respect to various content, such as keywords, based on bid prices and other related factors for an advertiser. In some cases, a provider will have an "auction" to determine which ad(s) to display, and in what order or position, based at least in part upon the highest bid price.

Systems and methods in accordance with various embodiments provide an automated solution to the issue of determining appropriate bid price adjustments for advertisements in an electronic environment. In one embodiment, an advertising efficiency is forecasted for each period over the course of a week for a given keyword class or grouping. In order to determine a schedule for a particular vendor or provider, the requirements of the provider are analyzed to determine any limit on the number of possible adjustments and any time constraints for those adjustments. A first variation threshold is established for a each day of the week, with the threshold able to be the same or different for any number of days. For each day, beginning with the first period at the beginning of the day, subsequent periods are added into a first partition until the average of the forecast efficiency for the partition meets or exceeds the first variation threshold with respect to the forecast efficiency for each period included in the partition. Then, starting with the next time period, another partition is started and subsequent periods are added into the second partition until the average of the partition meets or exceeds the first variation threshold with respect to the individual periods contained therein. This process continues, with additional partitions being created, until each time period for a day is included in a partition. The number of partitions then is examined to determine whether the number of partitions meets, or at least falls within, an allowable number of changes for a given provider. If so, the average adjustment (or a factor in relation thereto) for each partition is set as the adjustment for that partition, and the times and adjustments for each partition are added to the day parting schedule for that day. If the number of partitions does not meet or fall within the allowed amount, the variation threshold can be changed (i.e., increased) and the process can be repeated until the number of partition meets or falls within the allowed amount. The adjustment values for each partition then can be added to a day parting schedule and submitted to the provider.

FIG. 1 illustrates an example of an environment 100 for implementing aspects in accordance with various embodiments. As will be appreciated, although a Web-based environment is used for purposes of explanation, different environments may be used, as appropriate, to implement various embodiments. The environment 100 shown includes both a testing or development portion (or side) and a production portion. The production portion includes an electronic client device 102, which can include any appropriate device operable to send and receive requests, messages, or information over an appropriate network 104 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections, and combinations thereof. In this example, the network includes the Internet, as the environment includes a Web server 106 for receiving requests and serving content in response thereto, although for other networks an alternative device serving a similar purpose could be used as would be apparent to one of ordinary skill in the art.

The illustrative environment includes at least one application server 108 and a data store 110. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store, and is able to generate content such as text, graphics, audio, and/or video to be transferred to the user, which may be served to the user by the Web server in the form of HTML, XML, or another appropriate structured language in this example. The handling of all requests and responses, as well as the delivery of content between the client device 102 and the application server 108, can be handled by the Web server. It should be understood that the Web and application servers are not required and are merely example components, as structured code discussed herein can be executed on any appropriate device or host machine as discussed elsewhere herein. Further, the environment can be architected in such a way that a test automation framework can be provided as a service to which a user or application can subscribe. A test automation framework can be provided as an implementation of any of the various testing patterns discussed herein, although various other implementations can be used as well, as discussed or suggested herein.

The environment also includes a development and/or testing side, which includes a user device 118 allowing a user such as a developer, data administrator, or tester to access the system. The user device 118 can be any appropriate device or machine, such as is described above with respect to the client device 102. The environment also includes a development server 120, which functions similar to the application server 108 but typically runs code during development and testing before the code is deployed and executed on the production side and is accessible to outside users, for example. In some embodiments, an application server can function as a development server, and separate production and testing storage may not be used.

The data store 110 can include several separate data tables, databases, or other data storage mechanisms and media for storing data relating to a particular aspect. For example, the data store illustrated includes mechanisms for storing production data 112 and user information 116, which can be used to serve content for the production side. The data store also is shown to include a mechanism for storing testing data 114, which can be used with the user information for the testing side. It should be understood that there can be many other aspects that may need to be stored in the data store, such as for page image information and access right information, which can be stored in any of the above listed mechanisms as appropriate or in additional mechanisms in the data store 110. The data store 110 is operable, through logic associated therewith, to receive instructions from the application server 108 or development server 120, and obtain, update, or otherwise process data in response thereto. In one example, a user might submit a search request for a certain type of item. In this case, the data store might access the user information to verify the identity of the user, and can access the catalog detail information to obtain information about items of that type. The information then can be returned to the user, such as in a results listing on a Web page that the user is able to view via a browser on the user device 102. Information for a particular item of interest can be viewed in a dedicated page or window of the browser.

Each server typically will include an operating system that provides executable program instructions for the general administration and operation of that server, and typically will include a computer-readable medium storing instructions that, when executed by a processor of the server, allow the server to perform its intended functions. Suitable implementations for the operating system and general functionality of the servers are known or commercially available, and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 1. Thus, the depiction of the system 100 in FIG. 1 should be taken as being illustrative in nature, and not limiting to the scope of the disclosure.

Figure 2:
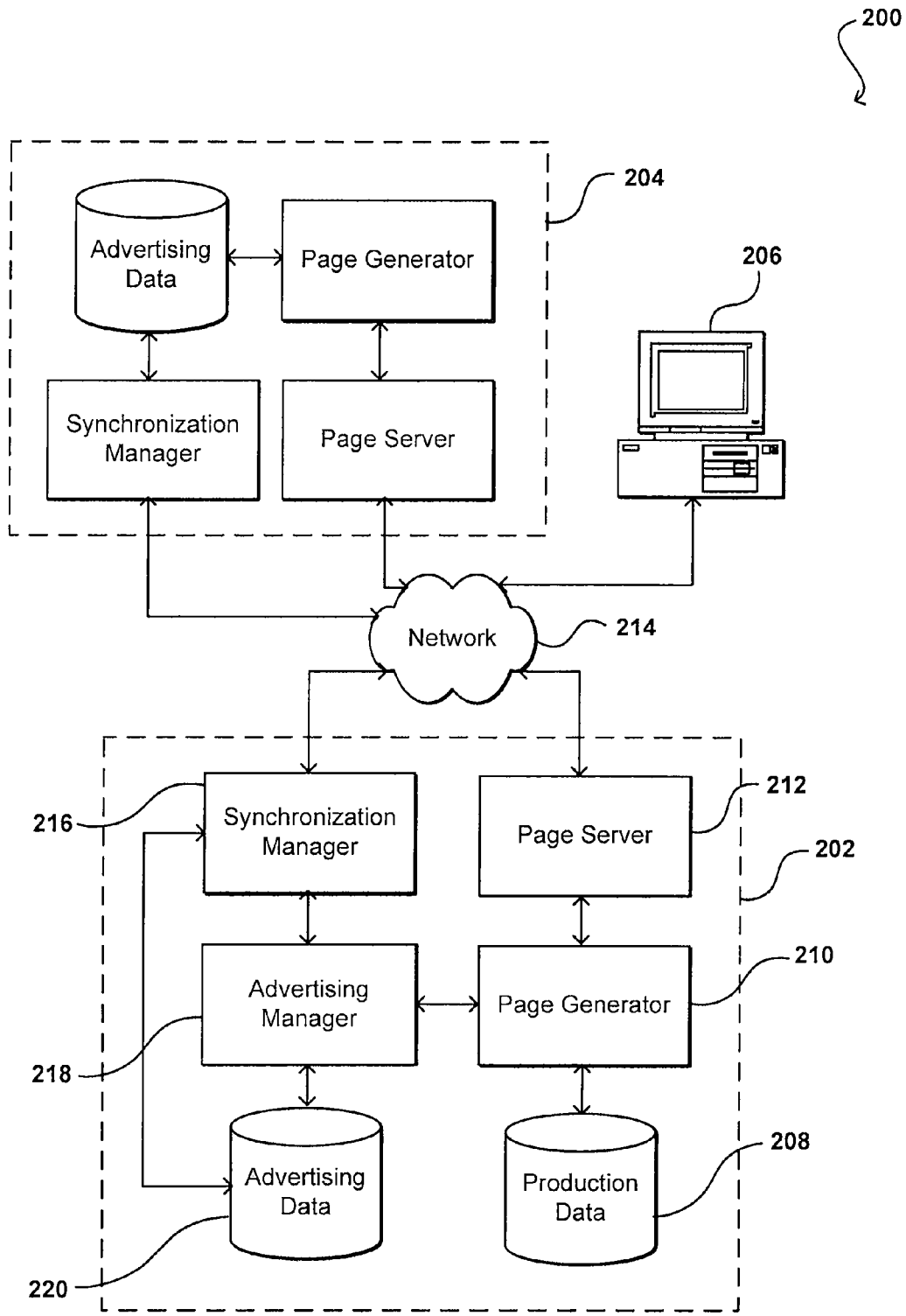
FIG. 2 illustrates components for determining aspects of advertisements to provide to a separate provider that can be used in accordance with one embodiment.

An environment such as that illustrated in FIG. 1 can be useful for a provider such as an electronic marketplace, wherein multiple associates or other content providers might wish to advertise on pages for the marketplace itself. As discussed above, however, sometimes a provider such as an electronic marketplace might wish to advertise on other sites or with other providers. The electronic environment in such a case might include additional components and/or other arrangements, such as those illustrated in the configuration 200 of FIG. 2. In this example, components for an advertising entity 202 can generate advertising associations such as keyword-landing page pairs, as well as related elements such as creative elements and bid prices, to be submitted to components for another provider 204. It should be understood that while keyword-landing page pairs and sponsored ads are used for purposes of explanation, any association of a navigational process with content in an electronic environment can be used with, and benefit from, selections and other processes described with respect to various embodiments.

In this example, the advertising entity generates and serves pages of content available to any appropriate end user 206, and thus can include components such as a production data store 208 that can be used by a page generator 210 to generate pages that can be served by a page server 212 (such as a Web server in a Web-based environment) over a network 214 to the end user 206. Similarly, any other appropriate provider 204 can include components such as page generator and page server components for generating and serving pages of content to a user. While many of the embodiments are described with respect to a Web-based environment, it should be understood that pages are not limited to Web pages, but can include any application page or other interface page that can be displayed or otherwise conveyed to a user.

If the advertising entity 202 wishes to advertise with the provider 204 using sponsored links or other advertisements that direct a user back to a page provided by the advertising entity, the advertising entity also can include components for determining the landing pages to be associated with the advertisements. While the advertising components in this example are shown to be part of the advertiser's system, it should be understood that these components can be part of a separate system or provided as a third party service, for example. In this example, the advertising entity system includes an advertising manager 218, which as discussed elsewhere herein can encompass, monitor, and/or control a number of different algorithms and components for selecting and deciding upon landing pages, as well as dynamically determining categories for each selected landing page, applying templates and/or creative elements for each category, and determining appropriate bid prices to use for each advertisement. When the advertising manager 218 decides on a landing page, category, and other such information to be associated with content on the provider pages, the advertising manager 218 can store the advertising data to an advertising data store 220, which in some embodiments can comprise separate tables in the production data store 208. The advertising data store can include any information related to advertising, such as ad performance data, bid histories, bid amounts, categorizations, creative elements, etc. Portions of this data alternatively can be stored and/or accessed from other appropriate storage devices of the system and/or across the network. The advertising entity's system also can include a synchronization manager 216 that can work with a synchronization component of the provider 204 to periodically synchronize the advertising data with the advertising data stored at the provider 204, such that the appropriate landing pages, creative content, and financial information can be designated and updated as desired. When a user 206 views a page of content served by the provider 204, the page can include an advertisement that will direct the user to a page of the advertising entity 202 upon selection by the user.

Figure 3:
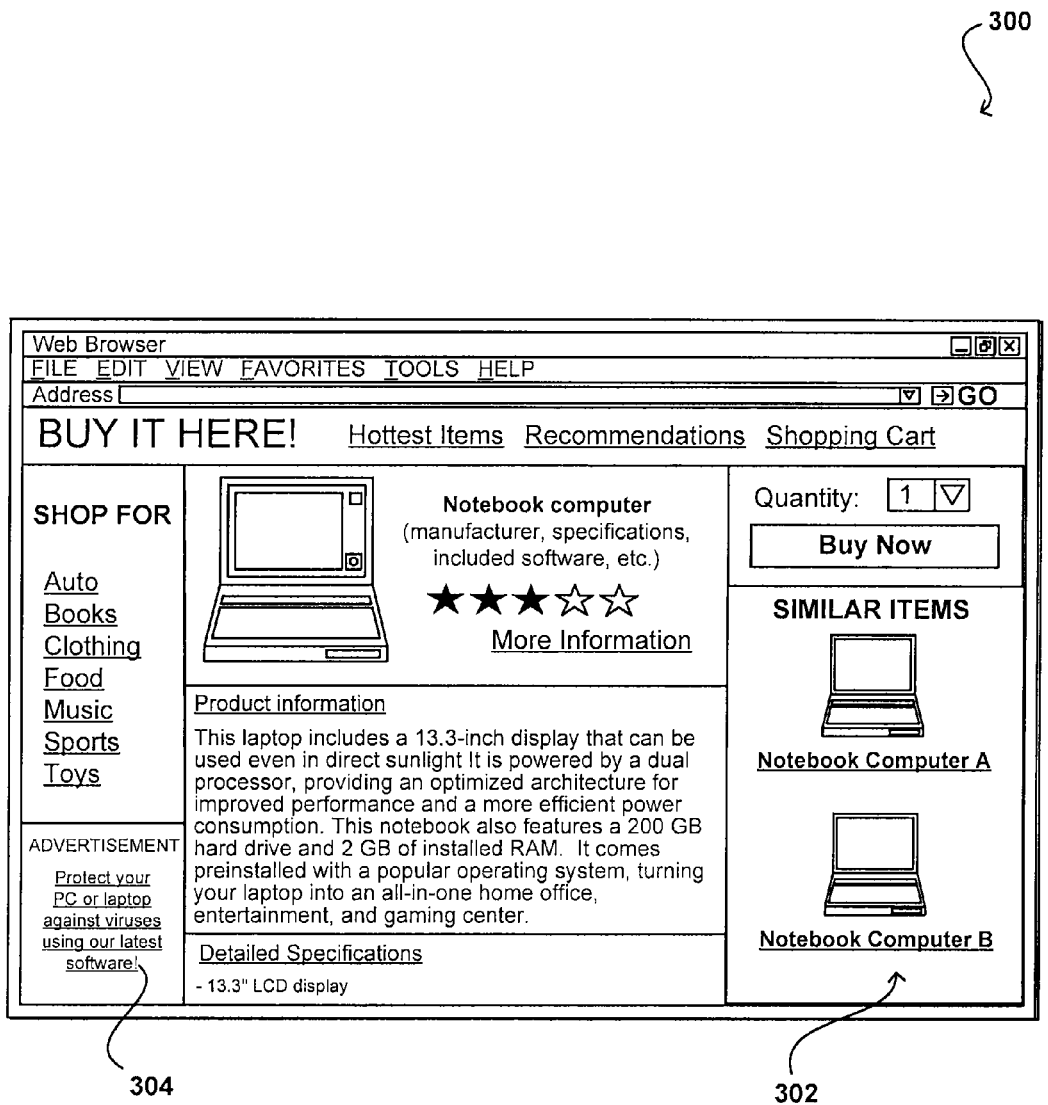
FIG. 3 illustrates an interface including a sponsored link that can be generated in accordance with one embodiment.

As discussed above, the advertisement can include at least one sponsored link, such as a hypertext links displayed on a Web page, for example. FIG. 3 illustrates an example of a Web page 300 displayed in a browser application, wherein the Web page includes a sponsored link 302 that directs a user to another portion of the site when selected, and another sponsored link 304 that directs the user to a site of a third party advertiser, etc. Sponsored links can be selected based on any appropriate factor, such as content of a page, a keyword used to navigate to that page, etc. Sponsored links also can be displayed on any other appropriate interface capable of following a link or similar navigational element to another source of information, and as such the term "link" will be used for purposes of explanation but should not be interpreted as limiting the types of navigational elements that can be used with various embodiments.

As discussed, sponsored links in one example are displayed when a user searches for information in a search engine, and receives a list of search results (referred to herein as a "results page"). There are many aspects to deciding which sponsored links might be desirable to be displayed on such a results page. For example, advertisers may wish to display ads that are relevant to the content of the search results, which might be of interest to the user. For example, a user searching for information on automobiles can, on average, be more likely to purchase a book on automotive repair than a set of steak knives. Thus, the advertiser would prefer to spend the advertising money with respect to those keywords or categories which are "relevant" to the item (e.g., any product or service that can be consumed) being advertised. Further, a category can have many subcategories, and an advertiser might not decide that the advertiser wants to spend money to advertise for an "automotive" category, but would rather advertise for an "automotive books" sub-category.

Once an advertiser decides which keywords, categories, or other aspects for which to advertise, such as by using an advertising manager as discussed above, the advertiser also has to decide how much the advertiser is willing to spend for each instance of that advertisement. In many major search engines, there can be several advertisers wishing to advertise for a given keyword or category, for example, and at least some of those advertisers are willing to pay a premium for being the most prominently featured advertisement displayed for a given keyword. In some cases only one advertisement with a link will be displayed, while in other cases there can be a list or set of ads displayed, and an advertiser might pay extra to be displayed closer to the top of a results page, etc. Many search engine and other such providers then allow these advertisers to bid for ad space, with the winning bid being displayed most prominently, and lower bids being displayed less prominently, if at all. An advertiser must then not only decide how much to bid for an advertisement based on projected conversions or revenue for each advertisement, but also must consider the placement of the advertisement on the result page and how much extra the advertiser is willing to pay to be featured more prominently. For example, an advertiser bidding $0.03 per advertisement (e.g., based on number of displayed links or number of followed links, for example) that is being featured third in a list of advertisers might be willing to adjust the bid price to $0.10 per advertisement to instead be featured at the top of the list. While this obviously can cost the advertiser more advertising revenue, the number of extra users following the top link might more than make up for the additional cost. Further, an advertiser might make significantly more money from an advertisement at certain times of the day, week, year, etc., and thus might be willing to spend differently at different times. An advertising manager thus may also be configured to analyze revenue, conversion rates, historical data, and other information that can be stored with the advertising data in order to determine an appropriate price to bid for each ad.

Various other aspects also can be taken into consideration. For example, if an advertiser spends a significant amount of money for an ad to be featured with a keyword or category, the advertiser would like to display information in addition to the sponsored link that is successful in getting users to want to follow the link. For example, an advertiser could display a generic message with each advertisement, such as the name and slogan of the advertiser, but that message might in general be less effective than a message tailored to the content or keyword. In the example where the user is searching for information about automobiles, a message such as "Buy the latest parts for your automobile at discount prices" might be substantially more effective than a generic message "Big Box Store—we offer everything under the sun". An advertiser might also want to tailor the message even further, based on the category or keyword. For example, a user searching for information about an automobile that has not yet been placed into the market, such as next year's new hybrid vehicle, might not be interested in seeing a message about buying parts since the car is not yet available. It might be beneficial to instead display a message such as "Get the latest books and magazines about the next generation hybrids". While more narrowly tailored ads can be significantly more successful, however, the number of possible keywords, categories, and sub-categories is extremely large and there must be some decisions made as to which categories and keywords make financial sense to provide with tailored advertisements, and at what level in the subcategories does the advantage of a further tailored message no longer make sense.

Once an advertisement has been placed and a user actually clicks on or otherwise selects a sponsored link, the user is directed to a landing page such as may be specified by the advertiser through the advertising manager. Considering an example of an online marketplace that offers items in several different categories, a basic approach would simply direct the user to the home page, welcome page, or other such introductory display for the marketplace. It can be more effective, however, to direct the user to a page (herein referred to as a "landing page") offering items or displaying information related to the keyword or category for which the advertiser decided to advertise and the user was searching for information. In the example where a user was searching for information about hybrid automobiles, an address for a landing page could be selected based on the landing page displaying information about automobiles, or more advantageously hybrid automobiles. Again, however, a decision can be made about the level that makes sense for each keyword or category. Given a marketplace with thousands or even millions of items, and the fact that there can be millions of possible categories and keywords, it can be desirable to have a system that automatically and accurately selects landing pages and other options for those choices that make financial sense for an advertiser. Conventional approaches would simply use a search index if the landing page is a search page or an item grouping if the landing page is a detail page for an item. These approaches typically do not get any more specific, and as such are of limited use or accuracy.

For each ad, an advertiser thus can desire to select an optimal landing page for each advertisement that will help to cause users to view and/or select the advertisement, and thus drive users to a landing page of the advertiser. There are many different approaches that can be used to select an appropriate landing page to associate with a keyword, such as are described in co-pending U.S. patent application Ser. No. 12/204,650, filed Sep. 4, 2008, entitled "Landing Page Selection for Linked Advertising".

It is typically not enough, however, to decide to advertise for a given keyword and determine an appropriate landing page to associate with that keyword. An advertiser typically must also consider other related aspects, such as the type of creative elements to include in the advertisement. Approaches for determining such elements are described, for example, in co-pending U.S. patent application Ser. No. 12/204,663, filed Sep. 4, 2008, entitled "Dynamic Categorizations for Electronic Advertising". An advertiser also in many cases must determine how much to spend for each instance of the advertisement. In many instances, this can include determining a maximum bid price to submit to an outside vendor or provider in order to attempt to "win" a position for the advertisement on the desired page, interface, etc. Approaches for determining such bid prices are described, for example, in co-pending U.S. patent application Ser. No. 12/204,636, filed Sep. 4, 2008, entitled "Dynamic Bid Price Determination for Electronic Advertisements". Each of these co-pending applications is hereby incorporated herein by reference.

An advertiser offering items for consumption might set as a target for a group of items that approximately 10% of the gross revenue is spent on advertising for that group. So for an item group or category, the advertising expenditure or "spend" can be totaled, and 10% of that total figure can be used for advertising. This percentage can be distributed differently across different items or subcategories, etc. For example, newer categories might have a higher amount attributed to advertising in order to bring attention to those categories. In other cases, various business goals might cause certain categories to be advertised more heavily, etc.

As discussed above, however, certain advertisements perform better on certain days, at certain times, and in certain geographic locations. Ads also can perform differently by other aspects or parameters, such as age of the customer, the gender of the customer, a particular vendor or provider causing the ad to be displayed, etc. When determining bid price, various embodiments can look to a parameter such as the efficiency of an advertisement. An efficiency ratio can be examined for advertisements that includes the advertising expenditure divided by gross revenue (that can be attributed to the respective advertising), referred to being referred to herein as the E % G value (efficiency as a percentage of gross revenue). Historical analysis of data can be used for trending and reporting to attempt to determine different efficiencies over different parameters, in order to attempt to spend the most money where the ads are most efficient, or where it otherwise makes sense for various business goals. A benefit of day parting, or adjusting bids based on factors such as the time of day or week, is that the spend can be adjusted as necessary to maintain the efficiency as close as possible to target.

Systems and methods in accordance with various embodiments can dynamically adjust and/or reallocate the amount of money spent (the "spend") on advertisements such as sponsored links or sponsored ads for different periods of time. For example, the advertising efficiency may be forecasted to be relatively low for particular times of day, days of the week, days of the month, weeks of the year, seasons, etc. In such cases, it can be desirable to instead shift the advertising spend to periods of time when the efficiency is forecasted to be relatively high. Using the E % G value in the example discussed above, a lower E % G value would correspond to a better forecasted efficiency. Based at least in part on this forecast efficiency, the spend can be reallocated in one embodiment by adjusting the base bids that have been determined and/or submitted for sponsored links or other such advertisements. For periods when efficiency is forecasted to be better or worse than average, the bids can be increased or decreased, respectively, such as by applying a percentage or other factor adjustment to the base bid. Such approaches in accordance with one embodiment provide for relatively uniform efficiency throughout the week, while not changing the forecasted overall weekly efficiency. A system for implementing such an approach can use a closed-loop control system, which uses feedback relating to the actual performance of an advertisement to predict future performance. Using such an approach, the periodic (e.g., daily, weekly, monthly, etc.) efficiency forecasts and the corresponding bid adjustments can be managed automatically, or without manual intervention.

Figure 4:
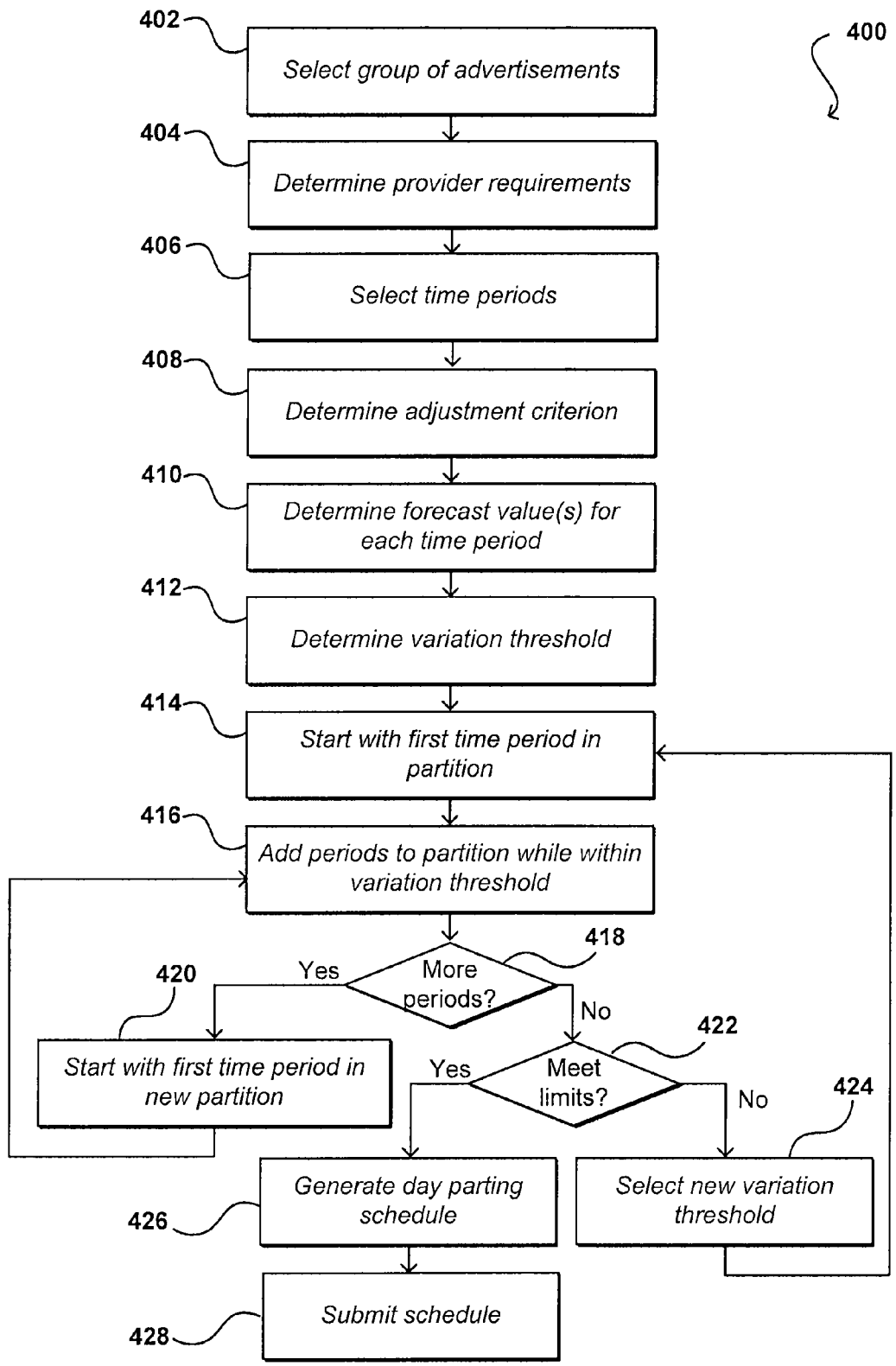
FIG. 4 illustrates steps of a process for determining bid price adjustments that can be used in accordance with one embodiment.

FIG. 4 illustrates steps of an example process 400 for allocating and/or reallocating spend that can be used in accordance with one embodiment. In this example process, a first grouping of advertisements is selected 402, such as a grouping advertisements for a given class of keywords for a given provider. As discussed elsewhere herein, this grouping can be determined using any other appropriate parameter values or criteria, such as geographic location, user demographic, etc. The bid adjustment requirements of the relevant provider to receive and display the ad also can be determined 404. Taking these requirements into account, a time period can be set for which to forecast efficiency or other such financial values 406. The time period in one embodiment is set to at most correspond to the minimum amount of time over which a provider allows a change. For example, if a provider only allows a bid adjustment every fifteen minutes, then a time period such as fifteen minutes can be selected in order to provide a result that can be implemented for the provider.

At least one criterion to use for adjustment also can be determined 408. For example, a user can select a forecast efficiency ratio to use for the adjustment, although any other comparison of a financial forecast and a financial target (or any other such information) can be used to determine a bid adjustment in accordance with various embodiments. Once at least one criterion has been determined, a forecast ratio can be determined for each time period 410. This ratio can correspond directly to a projected adjustment factor for that time period, or can be any other appropriate ratio from which an adjustment factor can be determined.

A first variation threshold can be determined for a current day for which adjustment factors are to be determined for the provider 412. In an example where the system looks to the adjustment factors or forecast efficiency ratios for each period, if the bid adjustment factors for each period range from 0.1 to 5.3, for example, then an appropriate variation threshold might be selected within that range, such as at 0.4. In other embodiments, where the system might instead analyze the average adjusted bids that would result for each period, if the adjusted bids would range from $0.05 to $1.00, for example, then an appropriate variation threshold might be $0.10. Starting at the first time period for the day (just after midnight on the current day, for example) a first partition is created 414, and subsequent time periods are added to the partition including as long as the average of the forecast efficiency for those time periods does not exceed the variation threshold with respect to the forecast efficiency for any one of those time periods 416. If there are more periods in the day that do not belong to a partition 418, the process starts another partition at the next period 420 and subsequent time periods are added to the partition as long as the average of those time periods does not exceed the variation threshold with respect to the individual time periods. If there are no more periods in the day, the number of partitions is compared with the number of allowed changes in a day for the particular provider 422. If the number of partitions exceeds the number of allowed changes, for example, a new variation threshold is selected 424 and the process is executed again, until finally a variation threshold results in a number of partitions that meets, or is within, the allowed number of changes. Once an acceptable number of partitions is determined, the average values and times for each partition are used to generate the day parting schedule 426 which is subsequently submitted to the provider 428.

In a specific example of such a process, a set of keyword classes is provided, each class being grouped together in at least one embodiment for the purpose of forecasting, such as by geographic locale or product groups associated with the keywords. The set of keyword classes can be selected based on any appropriate process for determining classes of keywords for which to place (or attempt to place) advertisements. In some embodiments the keyword classes can be selected manually, while in other embodiments various suggestion algorithms can be used such as described in the applications incorporated by reference above.

For a given keyword class, any of a number of appropriate values can be forecast for an upcoming period of time. In one embodiment, an hourly gross revenue ("GR") and hourly advertising efficiency (such as advertising expenditure divided by gross revenue that can be attributed to the respective advertising channel, referred to herein as E % G as discussed above) are forecasted once per week for the upcoming days. The forecasting is performed in one example using a weighted average of the same day of the week during previous weeks and taking into account the day parting schedules of those previous weeks. The average E % G for the week can be computed from the hourly E % G and GR forecasts for the week. In other embodiments, efficiency can be compared with any of a number of other economic values, such as top line values, profit values, costs to customer, long-term values, costs per session, number of sessions, number of units, or any other such values.

In order to compute an "ideal" day parting schedule (DPS) in accordance with one embodiment, such as where a provider does not limit the number of changes in a day, a day parting bid "multiple" is determined for each hour (or other such time period) in the week. A day parting bid multiple (DPBM) in general is a number used to alter bids in a given keyword class, or other such grouping, at a given day/time of the week by multiplying the DPBM with the raw or "base" bid set by an appropriate algorithm, process, etc. A DPS thus can be a set of DPBMs corresponding to various time-periods throughout a day or week for a given keyword class or other such grouping. A day parting schedule thus can be considered as a function of DPBM values, such as is given by:

$$DPS=\{DPBM_0, DPBM_1, \ldots DPBM_{167}\}$$

Such a function can be used to model the elasticity of the E % G value as E % G relates to bid values, as well as to produce bid multiples that will result in the performance at the target E % G, such as may be given by:

$$DPBM_t = f(efficiency_t, efficiency_{target})$$

where $efficiency_{target}$ is the forecasted weekly average E % G, and efficiency is the forecasted E % G for a given hour t. Such a schedule is referred to as "ideal" because in practice various providers will have criteria or limitations on day parting that must be met by an advertiser. Thus, the actual DPS used typically will require some provider-specific modification.

Further, a DPS should be able to function within any limitations inherent in the technology used to provide for day parting.

In one example, a scheduling process for a particular provider only allows for up to six time-partitions per day, with each partition being a multiple of a fifteen minute interval. Accordingly, a DPS for the provider in such a situation must comply with these criteria. An appropriate heuristic algorithm can be used that computes a provider-specific DPS that works within these limitations. In one such algorithm, a first variation tolerance $V_d$ is established for each day in the schedule. In one example, a range (or A value) is determined that corresponds to the maximum difference in efficiency, bid multiple, or other such factor as appropriate for the various periods throughout the day. A portion of this range, such as 10%, 20%, 25%, or 33% of the range, for example, can be taken as the variation tolerance. Other approaches can be used as well, such as by applying any of a number of fitting algorithms to the efficiencies, bid multiples, etc.

Starting with the first hour of each day, a first set of maximum consecutive hours can be grouped together using a first partition such that an average DPBM for the set varies no more than $V_d$ for any given $DPBM_t$ in that set. Once a first partition has been found, another partition can be determined starting with the hour after the last hour in the previous partition. The partitioning can continue iteratively until each hour of the day has been placed into one of the partitions.

If the correct number of partitions (here six) has been formed, then the DPBM for each partition can be defined as the average of the $DPBM_t$ for each hour in the partition. If more (or less) than the correct number of partitions have been found, then the value for $V_d$ can be adjusted, and the process can be iterated until a partitioning with the correct number of partitions is determined. This process can be repeated for each day of the week. Once the schedule is determined for the week, the DPS can be uploaded or otherwise communicated to the provider. As some providers charge per upload, it can be desirable to upload the schedule once a week in some embodiments. In other embodiments, the schedule can be updated each day, or at any other appropriate time. The process above can be modified to fit any number of partitions or length restrictions for partitions as should be apparent.

Some vendors or providers offer campaign-level day parting, wherein individual bids can be left alone but a campaign or group of ads, keywords, etc., can be adjusted by a day parting schedule. Since there may be hundreds of thousands of keywords per campaign, such an approach can be desirable from a maintenance, resource, and quality control standpoint, versus attempting to set individual schedules for each keyword. At the campaign level, an advertiser can specify a schedule of percentages (or other such factors) indicating how bids should be adjusted at various times. Different schedules also can be provided to different providers in different geographical areas, parameter values can be included specifying specific geographic areas for each adjustment, etc.

In some embodiments, it can be desirable to look to additional data, such as data for the same day, week, etc., from the last year or previous years. Factoring in such information can help to adjust for seasonal variations and other such aspects. In many cases, however, adjusting on a weekly basis will be sufficient to capture seasonal variations. Further, many things can change over a year and relying on a previous year's data may lead to undesirable changes that actually do not reflect current trends.

An approach in accordance with one embodiment also tracks data for previous weeks, such as the amount of adjustment in previous schedules. It can be desirable to look at the previous week's adjustment, as well as other previous adjustments, compared to the base bid generated. In some systems, there can be a cap or maximum threshold set for adjustments to ensure that bids for particular advertisements are not adjusted too far beyond the determined base bid. It also can be desirable to maintain the spend for an ad within a certain range throughout the course of a day or week. For example, it would in general be undesirable to adjust the bids to the point where the entire spend was allocated to a particular time period, with no spend being allocated to other times, simply because a particular time period is the most efficient. Similarly, even though the efficiency for an ad may be better at a particular time, an advertiser still might prefer to limit the variance to 25% over the course of a day. Further, tracking adjustment values over time can help a system to determine which adjustments worked and which adjustments had unfavorable results, which can help to determine limits or otherwise determine an optimal bid price at any given time. A system could look at the previous five adjustments and respective results, for example, and could attempt to determine the appropriate results based on that information.

An approach in accordance with one embodiment also can determine to not bid at all for certain ads at certain times, locations, etc. For example, if the projected efficiency for a particular time falls below a particular value, such as 0.5%, then an algorithm can set a multiplier of 0, −1, etc., or can otherwise result in no spend for that ad over a given time period. A potential downside to such an approach is that a competing advertiser might win the auction for a particular keyword and discover that the ad for that keyword on that provider performs relatively well, which can increase competition for that keyword at other times throughout the day, etc.

One approach allows certain keywords, categories, advertisements, or other such aspects to be added to a list or other component, such as a "blacklist", wherein no day parting or bid adjustment is performed for any item on the list. For example, if an advertisement for a keyword is performing especially well, an advertiser might not want to adjust the bid price and risk losing a position for that advertisement at any time. In another example, an advertiser might not want to risk increasing the spend for certain categories, etc. Variations of a blacklist also can be used, such as setting minimum or maximum adjustments, only allowing increases or decreases, etc.

Some approaches utilize "control groups" or other selected advertisements, keywords, or categories where bid adjustment is fixed, or temporarily disabled, in order to gather data for bids at the base rate. In some cases, it can be desirable to analyze or graph data resulting from the base bids in order to get a better idea of trends or other variations over time. For example, an advertiser might decide not to place bids in the middle of the night, but if the advertiser does not at least place some bids then the advertiser might never learn when it could become advantageous to advertise at those times.

Some approaches also allow any portion of a day parting schedule to be overridden. For example, an advertiser might want to manually set adjustments for a category of keywords in order to promote that category, shift spend to other categories, etc. An advertiser also might make deals for specific items such that the advertiser wants to spend more or less on a specific item. Many other uses of such manual settings should be apparent in light of the teachings and suggestions contained herein.

As discussed above, the various embodiments can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by the a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer-implemented method of adjusting a bid price for an advertisement in an electronic environment, comprising:

under the control of one or more computer systems configured with executable instructions, selecting a group of advertisements corresponding to a class of keywords for a provider operable to cause each of the advertisements to be displayed with a respective keyword;

determining a time interval corresponding to a minimum adjustment period for the provider;

computing a forecast advertising efficiency for each of a plurality of time intervals throughout a day for the group of advertisements;

starting with a first time interval in the day, grouping the plurality of time intervals into a plurality of partitions, each partition including adjacent time intervals with an average forecast advertising efficiency that does not exceed a variation threshold with respect to a forecast advertising efficiency for any of the included time intervals;

if the number of partitions does not meet an acceptable number of partitions for the provider, adjusting the variation threshold and regrouping the plurality of time intervals until the number of partitions meets an acceptable number of partitions; and submitting a schedule of bid adjustments to the provider for the class of keywords, the bid adjustments computed to be applied to a base bid price for any of the plurality of advertisements when one of the plurality of advertisements is selected to be displayed for one of the class of keywords, each bid adjustment corresponding to the time intervals and average forecast advertising efficiency included in a respective partition.

2. A method according to claim 1, wherein:
the provider is a search engine operable to receive any of the class of keywords from at least one user and generate a page of search results in response thereto, the page of search results being configured to include at least one ad selected based on an adjusted bid price.

3. A method according to claim 2, wherein:
the provider applies the bid adjustment to a base bid for each advertisement to determine the adjusted bid price before selecting at least one ad to be displayed for the page.

4. A computer-implemented method of adjusting a bid price for an advertisement in an electronic environment, comprising:
under the control of one or more computer systems configured with executable instructions,
computing an estimated advertising efficiency for each of a plurality of time intervals throughout a day for a plurality of advertisements having at least one common aspect;
grouping the plurality of time intervals into a plurality of partitions, each partition including adjacent time intervals with an average estimated advertising efficiency that does not exceed a variation threshold with respect to the estimated advertising efficiency for any of the included time intervals;
if the number of partitions does not meet an acceptable number of partitions, adjusting the variation threshold and regrouping the plurality of time intervals until the number of partitions meets an acceptable number of partitions; and
submitting a set of bid adjustments to be applied to a base bid price for each of the plurality of advertisements, each bid adjustment corresponding to the time intervals and average estimated advertising efficiency included in a respective partition.

5. A method according to claim 4, wherein:
the estimated advertising efficiency is a function of a forecast advertising efficiency versus a target advertising efficiency for the plurality of advertisements.

6. A method according to claim 5, wherein:
the forecast advertising efficiency is function of a forecast spend versus a forecast gross revenue.

7. A method according to claim 4, wherein:
multiple sets of bid adjustments are generated, each set corresponding to at least one of a different provider, a different geographic region, and a different category of keywords.

8. A method according to claim 4, wherein:
the set of bid adjustments is submitted to a provider of electronic content operable to adjust the base bid price for each advertisement based on the corresponding bid adjustments.

9. A method according to claim 8, wherein:
the provider specifies at least one of a minimum time interval and an allowed number of partitions.

10. A method according to claim 4, wherein:
a set of bid adjustments includes a schedule of adjustments for each day of an upcoming week.

11. A method according to claim 4, further comprising:
monitoring bid adjustments over time; and
ensuring that bid adjustments do not exceed a maximum adjustment threshold.

12. A method according to claim 4, wherein:
the plurality of advertisements having at least one common aspect correspond to a class of keywords for a provider operable to cause each of the advertisements to be displayed with a respective keyword.

13. A method according to claim 4, wherein:
the estimated advertising efficiency is based on a weighted average of bid data for the same time interval in at least one of previous weeks and previous years.

14. A method according to claim 4, further comprising:
determining the base bid price for each advertisement.

15. A method according to claim 4, further comprising:
determining an adjustment factor that will result in a bid price for a selected partition not being selected by a provider when the estimated average advertising efficiency for that partition falls below a minimum efficiency threshold.

16. A method according to claim 4, further comprising:
maintaining a list of advertisements for which no bid adjustment is to be submitted.

17. A system for adjusting a bid price for an advertisement in an electronic environment, comprising:
a processor; and
a memory device including instructions that, when executed by the processor, cause the processor to:
determine an estimated advertising efficiency for each of a plurality of time intervals throughout a day for a plurality of advertisements;
group the plurality of time intervals into a plurality of partitions, each partition including adjacent time intervals with an average estimated advertising efficiency that does not exceed a variation threshold with respect to an estimated advertising efficiency for any of the included time intervals;
if the number of partitions does not meet an acceptable number of partitions, adjust the variation threshold and regrouping the plurality of time intervals until the number of partitions meets an acceptable number of partitions; and
submit a set of bid adjustments to be applied to a base bid price for each of the plurality of advertisements, each bid adjustment corresponding to the time intervals and average estimated advertising efficiency included in a respective partition.

18. A system according to claim 17, wherein the memory further includes instructions that, when executed by the processor, cause the processor to:
generate multiple sets of bid adjustments, each set corresponding to at least one of a different provider, a different geographic region, and a different category of keywords.

19. A system according to claim 17, wherein the memory further includes instructions that, when executed by the processor, cause the processor to:
submit the set of bid adjustments a provider of electronic content operable to adjust the base bid price for each advertisement based on the corresponding bid adjustments.

20. A system according to claim 17, wherein the memory further includes instructions that, when executed by the processor, cause the processor to:
monitor bid adjustments over time; and
ensure that bid adjustments do not exceed a maximum adjustment threshold.

21. A system according to claim 17, wherein the memory further includes instructions that, when executed by the processor, cause the processor to:

determine the estimated advertising efficiency based at least in part on a weighted average of bid data for the same time interval in at least one of previous weeks and previous years.

22. A system according to claim 17, wherein the memory further includes instructions that, when executed by the processor, cause the processor to:

determine an adjustment factor will result in a bid price for a selected partition not being selected by a provider when the estimated average advertising efficiency for that partition falls below a minimum efficiency threshold.

23. A computer program product embedded in a computer readable storage medium for adjusting a bid price for an advertisement in an electronic environment, comprising:

program code executable by one or more processors for computing an estimated advertising efficiency for each of a plurality of time intervals throughout a day for a plurality of advertisements having at least one common aspect;

program code executable by the one or more processors for grouping the plurality of time intervals into a plurality of partitions, each partition including adjacent time intervals with an average estimated advertising efficiency that does not exceed a variation threshold with respect to an estimated advertising efficiency for any of the included time intervals;

program code executable by the one or more processors for, if the number of partitions does not meet an accepted number of partitions, adjusting the variation threshold and regrouping the plurality of time intervals until the number of partitions meets an accepted number of partitions; and program code executable by the one or more processors for submitting a set of bid adjustments to be applied to a base bid price for each of the plurality of advertisements, each bid adjustment corresponding to the time intervals and average estimated advertising efficiency included in a respective partition.

24. A computer program product according to claim 23, further comprising:

program code executable by the one or more processors for generating multiple sets of bid adjustments, each set corresponding to at least one of a different provider and a different geographic region.

25. A computer program product according to claim 23, further comprising:

program code executable by the one or more processors for monitoring bid adjustments over time; and program code executable by the one or more processors for ensuring that bid adjustments do not exceed a maximum adjustment threshold.

\* \* \* \* \*